(12) United States Patent
Lin et al.

(10) Patent No.: US 9,477,994 B2
(45) Date of Patent: Oct. 25, 2016

(54) GLOBAL RELATIONSHIP MODEL AND A RELATIONSHIP SEARCH METHOD FOR INTERNET SOCIAL NETWORKS

(71) Applicant: National Taiwan University, Taipei (TW)

(72) Inventors: Phone Lin, Taipei (TW); Pai-Chun Chung, Taoyuan County (TW)

(73) Assignee: NATIONAL TAIWAN UNIVERSITY, Taipei (TW)

(*) Notice: Subject to any disclaimer, the term of this patent is extended or adjusted under 35 U.S.C. 154(b) by 117 days.

(21) Appl. No.: 14/315,830

(22) Filed: Jun. 26, 2014

(65) Prior Publication Data

US 2015/0006635 A1    Jan. 1, 2015

Related U.S. Application Data

(60) Provisional application No. 61/840,036, filed on Jun. 27, 2013.

(51) Int. Cl.
| | |
|---|---|
| *G06F 15/16* | (2006.01) |
| *G06F 17/30* | (2006.01) |
| *G06F 21/60* | (2013.01) |
| *G06Q 99/00* | (2006.01) |
| *H04L 29/06* | (2006.01) |
| *G06Q 50/00* | (2012.01) |
| *H04L 29/08* | (2006.01) |

(Continued)

(52) U.S. Cl.
CPC .......... *G06Q 50/01* (2013.01); *H04L 67/1044* (2013.01); *H04L 67/1059* (2013.01); *G06F 17/30702* (2013.01); *G06F 17/30867* (2013.01); *G06Q 10/107* (2013.01); *G06Q 30/02* (2013.01); *H04L 63/102* (2013.01); *H04L 67/306* (2013.01)

(58) Field of Classification Search
CPC .... G06Q 50/01; G06Q 10/107; G06Q 30/02; G06F 17/30702; G06F 17/30867; G06F 2221/2117; H04L 63/0245; H04L 63/102; H04L 65/1069; H04L 67/306
See application file for complete search history.

(56) References Cited

U.S. PATENT DOCUMENTS

| | | | | |
|---|---|---|---|---|
| 7,698,380 | B1* | 4/2010 | Amidon | G06Q 10/04 709/217 |
| 8,135,800 | B1* | 3/2012 | Walsh | G06F 17/30702 707/723 |

(Continued)

OTHER PUBLICATIONS

Phone Lin et al., P2P-iSN: A Peer-to-Peer Architecture for Heterogeneous Social Networks, IEEE Network, Jan./Feb. 2014, pp. 56-64.

(Continued)

*Primary Examiner* — Nicholas Taylor
*Assistant Examiner* — Ho Shiu
(74) *Attorney, Agent, or Firm* — WPAT, P.C., Intellectual Property Attorneys; Anthony King

(57) ABSTRACT

The present application provides a peer-to-peer networking method and system for integrating heterogeneous social networks. The method applied in a server device includes the following steps: First, the server device connects with a plurality of peer nodes; each of the peer node defines a user end and accessing at least one social network. Then, the server device according to a social relationship of the social networks links to the corresponding peer nodes for integrating a peer-to-peer social network (P2P-iSN) which configures a plurality of social paths among the peer nodes from the different social networks.

8 Claims, 8 Drawing Sheets

(51) Int. Cl.
 *G06Q 30/02* (2012.01)
 *G06Q 10/10* (2012.01)

(56) References Cited

U.S. PATENT DOCUMENTS

| | | | | |
|---|---|---|---|---|
| 8,554,794 B2* | 10/2013 | Brydon | G06Q 10/107 | 707/785 |
| 8,566,252 B2* | 10/2013 | Harding | G06Q 10/06 | 705/1.1 |
| 8,938,500 B1* | 1/2015 | Acharya | G06Q 50/01 | 705/319 |
| 8,958,537 B1* | 2/2015 | Saylor | H04M 3/42068 | 379/142.04 |
| 2007/0226248 A1* | 9/2007 | Darr | G06Q 10/10 | |
| 2007/0250566 A1* | 10/2007 | Appelman | H04L 51/04 | 709/204 |
| 2009/0055476 A1* | 2/2009 | Markus | G06Q 10/00 | 709/204 |
| 2009/0080635 A1* | 3/2009 | Altberg | G06Q 30/02 | 379/216.01 |
| 2009/0222517 A1* | 9/2009 | Kalofonos | G06Q 10/10 | 709/204 |
| 2009/0259720 A1* | 10/2009 | Heins | G06Q 10/10 | 709/205 |
| 2011/0035503 A1* | 2/2011 | Zaid | H04L 63/0407 | 709/228 |
| 2011/0071953 A1* | 3/2011 | Shen | G06Q 30/02 | 705/319 |
| 2011/0103682 A1* | 5/2011 | Chidlovskii | G06K 9/6284 | 382/159 |
| 2011/0296004 A1* | 12/2011 | Swahar | G06F 17/3053 | 709/224 |
| 2011/0302412 A1* | 12/2011 | Deng | H04L 63/0407 | 713/159 |
| 2012/0036079 A1* | 2/2012 | Jacob Sushil | G06Q 10/00 | 705/319 |
| 2012/0042000 A1* | 2/2012 | Heins | G06Q 10/10 | 709/201 |
| 2012/0096002 A1* | 4/2012 | Sheehan | G06Q 50/01 | 707/737 |
| 2012/0271933 A1* | 10/2012 | Mtibaa | H04L 12/5855 | 709/223 |
| 2013/0021345 A1* | 1/2013 | Hsiao | G06F 3/0484 | 345/440.2 |
| 2013/0254213 A1* | 9/2013 | Cheng | G06Q 50/01 | 707/748 |
| 2013/0254305 A1* | 9/2013 | Cheng | H04L 51/32 | 709/206 |
| 2013/0325948 A1* | 12/2013 | Chen | G06Q 50/01 | 709/204 |
| 2014/0019557 A1* | 1/2014 | Hardas | G06Q 10/107 | 709/206 |
| 2014/0179439 A1* | 6/2014 | Miura | A63F 13/12 | 463/42 |
| 2014/0214941 A1* | 7/2014 | Shapero | H04L 51/26 | 709/204 |
| 2014/0230066 A1* | 8/2014 | Hurwitz | H04L 63/102 | 726/26 |
| 2014/0237040 A1* | 8/2014 | Brooks | G06Q 50/01 | 709/204 |
| 2014/0244335 A1* | 8/2014 | Baldwin | G06Q 10/063118 | 705/7.17 |
| 2014/0274358 A1* | 9/2014 | Hoskins | A63F 13/00 | 463/29 |
| 2014/0297742 A1* | 10/2014 | Lyren | H04L 67/1044 | 709/204 |
| 2015/0026120 A1* | 1/2015 | Chrapko | G06Q 50/01 | 707/609 |
| 2015/0127565 A1* | 5/2015 | Chevalier | G06Q 10/00 | 705/319 |

OTHER PUBLICATIONS

Abstract, P2P-iSN: A Peer-to-Peer Architecture for Heterogeneous Social Networks.

* cited by examiner

| ID | Phone no. |
|---|---|
| john | 0910456 |
| Bob | 0910123 |
| ... | ... |

(a)

| Personal information | | | Social network information | | | | Address information | |
|---|---|---|---|---|---|---|---|---|
| ID | Phone no. | Email | SN type | T value | Timestamp | Online | IP | Port |
| john_f | 0910456 | john@gmail.com | Facebook | 0.9 | 11'1211 | On_12'0215_1430 | 140.112.5.5 | 12345 |
| john_t | 0910456 | john@gmail.com | Twitter | 0.85 | 12'0214 | Off_12'0214_1430 | Null | Null |
| Bob_f | 0910123 | Bob@gmail.com | Facebook | 0.6 | 12'0110 | On_12'0209_1000 | 140.112.6.6 | 11100 |
| ... | ... | ... | ... | ... | ... | ... | ... | ... |

| ID | Phone no. | Email | IP | Port | SN type |
|---|---|---|---|---|---|
| John_f | 0910123 | John@gmail.com | 140.112.5.5 | 12345 | Facebook |
| Bob_f | 0910456 | Bob@gmail.com | 140.112.6.6 | 11100 | Facebook |
| Bob_t | 0910456 | Bob@gmail.com | 140.112.6.6 | 11100 | Twitter |
| Jenny_f | 0910789 | Jenny@gmail.com | 140.112.7.7 | 16161 | Facebook |
| Jenny_t | 0910789 | Jenny@gmail.com | 140.112.7.7 | 16161 | Twitter |
| ... | | | | | |

Global ID list

Fig. 4

```
Input: s, r, P, Z(P)
Output: P_new, Z(P_new)
1 foreach v : v ∈ G - P do
2    if v = r then
3        P_new ← P ∪ {s → v};
4        Z(P_new) ← Z(P)F(s, v);
5        return;
6    else if v is online, and Z(P)F(s, v) > Δ then
7        v.i Search(v, r, P ∪ {s → v}, Z(P)F(s, v));
8    else if v is off-line, or Z(P)F(s, v) ≤ Δ then
9        quit;
10   end
11 end
```

GLOBAL RELATIONSHIP MODEL AND A RELATIONSHIP SEARCH METHOD FOR INTERNET SOCIAL NETWORKS

BACKGROUND OF THE INVENTION

1. Field of the Invention

The present application relates to a relationship network search method. More particularly, the present application relates to a relationship search method based on integrated heterogeneous social network.

2. Description of the Prior Art

Social Network Sites (SNSs) such as Facebook™ and Linkedin™ have transformed today's society by providing easily accessible platforms for users to connect, communicate, and share vast amount of information. With SNSs, people keep in touch with their contacts, reconnect with old acquaintances, and establish new relationships with others based on shared features such as hobbies, interests, and overlapping friendship. The population of SNS users and the number of SNSs has been growing rapidly. For example, Facebook™ is estimated to have over one billion active users. Although it is hard to obtain an accurate estimate, there are thousands of SNSs all over the world that provide different kinds of services.

As a result, a user may register with multiple SNSs for different social network applications, carry multiple SNS accounts, interact with contacts from different SNSs, publish and access different web contents, and share contents within each SNS community. While SNSs offer different services, one key feature shared among SNSs is how they are built around users and users' existing social networks. Yet each SNS is isolated, so users manage their profiles and build relationships separately on different SNSs. The content for the same user in different SNSs may overlap, so it becomes a burden for users to manage contents across different SNSs.

Thus, providing a system and method for integrating heterogeneous social network demand of the area is a technical issue need to be solved in the technical field.

SUMMARY OF THE INVENTION

To solve the aforementioned technical issue of conventional technologies, one objective of the invention is to provide a system and method for integrating the heterogeneous social network.

To achieve the aforementioned objective, the present application provides a peer-to-peer networking method for integrating heterogeneous social networks, applied in a server device. The method comprises of the steps listed below. First, the server device connects with a plurality peer nodes. Each of the peer nodes defines a user end and accessing at least one social network. Then, the server device according to a social relationship of the social networks links the corresponding peer nodes for integrating a peer-to-peer social network (P2P-iSN) which configures a plurality of social paths among the peer nodes from the different social networks.

To achieve the aforementioned objective, the present application provides a peer-to-peer networking system for integrating heterogeneous social networks. The system comprises of a communication module and a process module. The communication module connects with a plurality peer nodes. Each of the peer nodes defines a user end and accessing at least one social network. The processing module connects with the communication module, the processing module according to a social relationship of the social networks links the corresponding peer nodes for integrating a peer-to-peer social network (P2P-iSN) which configures a plurality of social paths among the peer nodes from the different social networks.

As aforementioned description, the system and method of present application integrates the heterogeneous network and generates corresponding social paths which are provide the user connect to his friends by the same social network or different social network in the same time.

BRIEF DESCRIPTION OF THE DRAWINGS

FIG. 2 shows format of a friend list of the present application;

FIG. 4 shows Global ID list of the present application;

DETAILED DESCRIPTION OF THE PREFERRED EMBODIMENT

To express the technical features, contents, advantages and effects of the present application to assist examiner in understanding the present application, the specification and drawings are expressed in embodiments as followed. The drawings are provided to exemplarily show the present application and may not show the true ratio and arrangement of the present application. The drawings are not intended to limit the scope of the present application with the ratio and arrangement thereof.

Figure 1:
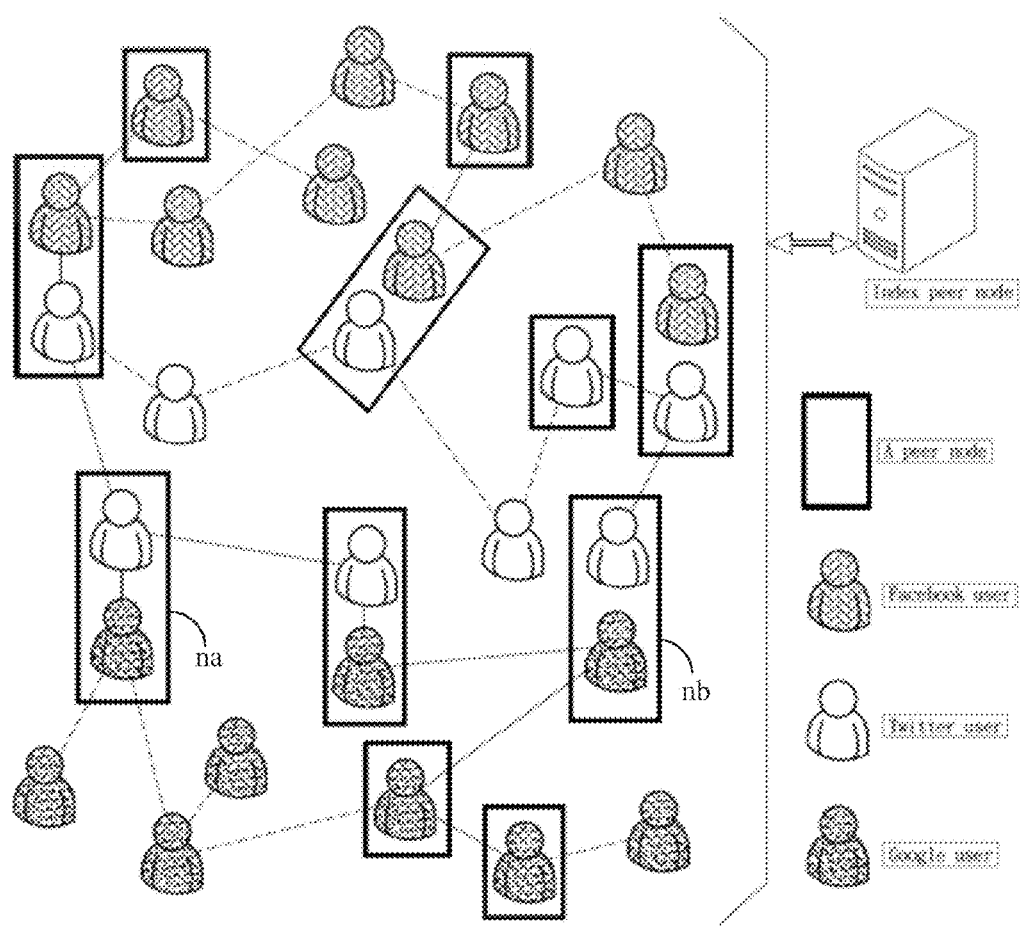
FIG. 1 shows system architecture of the peer-to-peer social network (P2P-iSN) of present application.

FIG. 1 shows a peer-to-peer social network (P2P-iSN) structure comprises three kinds of social network (Facebook™, Twitter™, and Google™) and two kinds of nodes: peer nodes and index peer nodes.

A peer node is installed on an end-device (e.g., PDA, smart phone, or desktop) for a user to access SNSs and connect to server device, and its main functionality is to integrate heterogeneous SNSs. The user of a peer node may register to one or more SNSs on his end-device, and possibly login to one or more SNSs at the same time. Present application uses a unique user ID to associate these different accounts of the same user from heterogeneous SNSs. A unique user ID can be some kind of authenticated information like user's cell phone number or verifiable email address. The index peer node is installed in a server device and responsible for maintaining the communication status (i.e., online or off-line) and the routing information (i.e., IP address) of each peer node. When a peer node is turned on, it reports to the index peer node the online status, which comprises of its ID and IP address of the peer node. Upon receiving the online status, the index peer node updates the online status for the peer node. If a user a of the peer node na and a user b of the peer node nb are on each other's friend list in a SNS, and na and nb are turned on, these two online peer nodes can communicate with each other by using the corresponding IP addresses queried from the index peer node. The peer nodes can establish social paths among users from different SNSs and build the so-defined "global relationship."

With the peer-to-peer network architecture, P2P-iSN allows users from heterogeneous SNSs to communicate without involving any specific SNS, and the integration is independent of any specific SNS. In other words, the integration does not incur overhead to the SNSs. By applying P2P-iSN, present application provides a Global Relationship Model to assess the strength of the global relationship between two users from heterogeneous SNSs. Based on the global relationship model, present application provides a searching mechanism, namely i-Search, to find the social path between two users from heterogeneous SNSs. Present application also provides an analytical model to evaluate the performance of the i-Search mechanism in terms of the "path found" probability and conduct extensive simulation studies to validate our analytical results.

Present application uses the cell phone number as an example for the unique ID. The phone book in a peer node (e.g., Jenny's end device) is used as the base to integrate heterogeneous SNSs. Take FIG. 2a as an example. Jenny has a friend John with phone number "0910456."

A database, friend list, is maintained to store the information about a user's friends. FIG. 2b shows the format of a friend list. The friend list comprises three kinds of information: personal information, social network information, and address information.

Personal information field stores the IDs of the user's friends, including the ID in SNS, phone number, and email address. In different SNSs, users may use different IDs. As shown in FIG. 2b, for example, Jenny's friend, John, uses the ID, "John_f", on Facebook™ and use the ID, "John_t", on Twitter™). The phone number associates the entry in the phone book with the entry in the friend list. An entry in the phone book may be mapped to multiple entries in the friend list.

Social Network Information field comprises four subfields, including SN Type, T Value, Timestamp, and Online. The SN Type indicates which SNS the friend has registered. For example, in FIG. 2b, Jenny's friend, John, registered to Facebook™ using ID "John_f." The T Value stores the result calculated by using Eq. 1 in the global relationship model, indicating the frequency that a user performs some kind of social activities on his friend (e.g., Jenny posts a comment, click a "Like", or send a message on John's wall in Facebook™). For example, in (1) in FIG. 2b, the T Value for Jenny←John on Facebook™ is 0.9. The Timestamp field stores the time when the T Value was calculated. The Online indicates that whether the friend is on the SNS now or not and when John logins to the Facebook™ last time. If the value of Online is "On" ("Off"), the time is when John logins/logouts Facebook™. For example, in FIG. 2b, "On_12'0215_1430" implies that John_f logins Facebook™ at 14:00 on Feb. 15, 2012, and is now on Facebook™.

Address Information field stores the IP address and the port number of the friend's end-device. This information is valid when the peer node of the friend is turned on.

Figure 3:
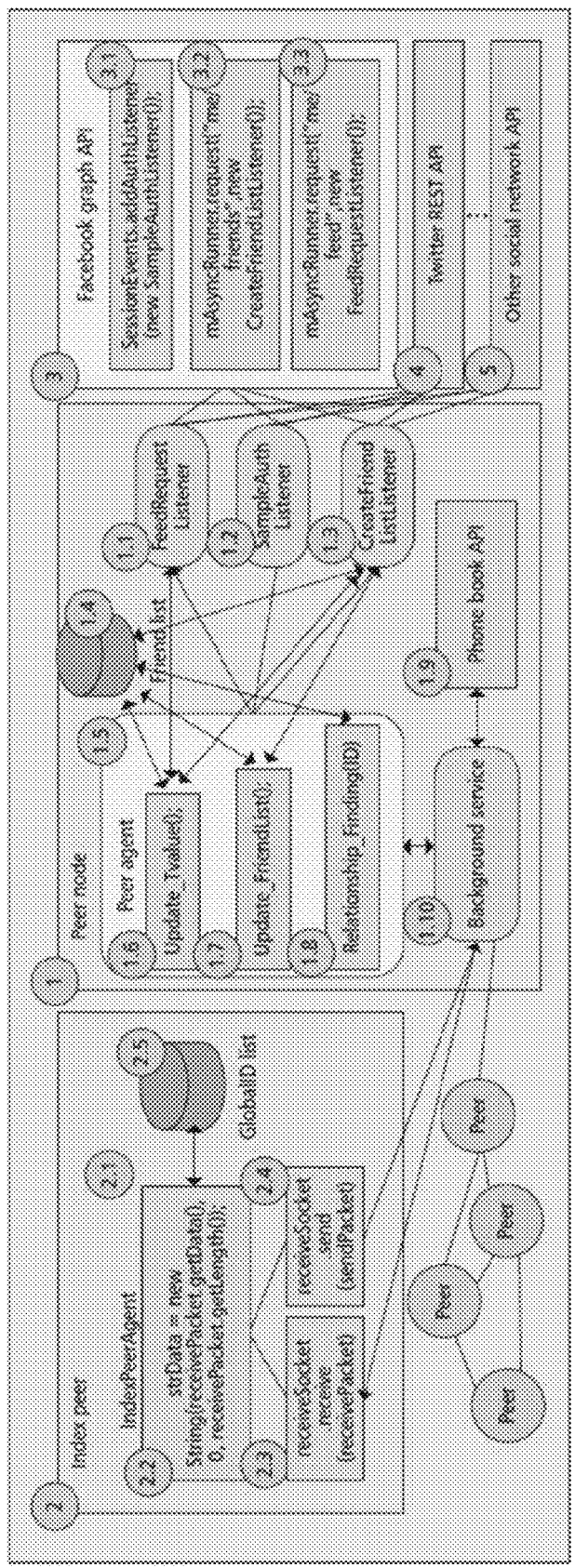
FIG. 3 shows software architecture of P2P-iSN of present application.

FIG. 3 shows the software architecture of a P2P-iSN. The software architecture of a peer node 1 comprising five classes and a function, PeerAgent 1.5, FeedRequestListener 1.1, SampleAuthListener 1.2, CreateFriendListListener 1.3, BackgroundService 1.10, and a PhoneBook API 1.9. The details for the five classes are described below:

The FeedRequestListener 1.1 is responsible for getting the status of a user's social activities on SNS by invoking the API, mAsyncRunner.request("me/feed", newFeedRequestListener( )) 3.3, provided by the SNS (e.g., Facebook Graph API 3, Twitter REST API 4, other social network API 5, etc.).

The SampleAuthListener 1.2 is responsible for authenticating a user when he turns on the peer node and login an SNS. The SampleAuthListener 1.2 is implemented by using the API SessionEvents.addAuthListener(new SampleAuthListener( )) 3.1 provided by the SNS.

The CreateFriendListListener 1.3 is responsible for obtaining the IDs of a user's friends in an SNS by invoking the API, mAsyncRunner.request("me/friends", new CreateFriendListListener( )) 3.2, and maintaining the user's friend list.

The BackgroundService class 1.10 is responsible for the message exchange between two peer nodes and between a peer node and an index peer node 2. The class provides the communication channel among peer nodes for the i-Search mechanism. To be more specific, a peer node uses this class to request another peer node to execute the i-Search mechanism to be elaborated later. The peer node uses this class to inform his online status to the index peer node.

The Peer Agent 1.5 is the main class. There are three functions defined in Peer Agent1. 1.5 including the following functions: Update_Tvalue( ) 1.6, the Update_FriendList( ) 1.7, and the Relationship_Finding( ) 1.8. The Update_Tvalue( ) 1.6 and the Update_FriendList( ) 1.7 are used to respectively update the T Value and Online field in the friend list. The Relationship_Finding( ) 1.8 implements the i-Search mechanism to identify the directional social path between two users.

The Phone Book API 1.9 is used to fetch a user's phone book friends. Several smart phone operating systems provides such an API, for example, Android API. It is executed in the login procedure. By using the phone number, it can identify two or more accounts of the same user to integrate different SNSs.

An index peer node 2 is a database that maintains the GlobalID list 2.5 with the format as shown in FIG. 4. For each online peer node, an entry is created in the GlobalID List 2.5 for the peer node. Similar to the Friend List 1.4, the GlobalID List 2.5 comprises three kinds of information: Personal Information, Social Net-work Information, and Address Information for an online user.

The Personal information field stores the IDs of a user, including the ID in SNS used by the user to login an SNS, phone number, and email address. Note that a user may turn on a peer node by logging into one or more SNSs concurrently, there may be one or more SNS IDs for the same user (i.e., multiple entries for the same user exist in the GlobalID List 2.5. These multiple entries are linked using the same phone number (or email address) of the user. Note that in our implementation, we may select only one of the IDs for a user to be stored in the index peer node (e.g., the user's phone number) so that the IDs for a user can be kept unknown to the index node.

The Social Network Information field stores the SNS Type indicating which SNS the user logins currently (i.e., online).

The Address Information field stores the IP address and the port number of the peer node turned on by the user. This information is valid when the peer node is turned on.

FIG. 3 shows the software architecture of the index peer node 2. There are one main class IndexPeerAgent 2.1 and a database GlobalID List 2.5. In the main class IndexPeerAgent 2.1, the receiveSocket.receive( ) function 2.3 is executed to receive the message sent from a peer node 1. Upon receiving a message, the receivePacket.getData( ) 2.2 is invoked to get the information carried in this message. The receiveSocket.send( ) 2.4 is responsible for sending the response message to a peer node 1.

Figure 5:
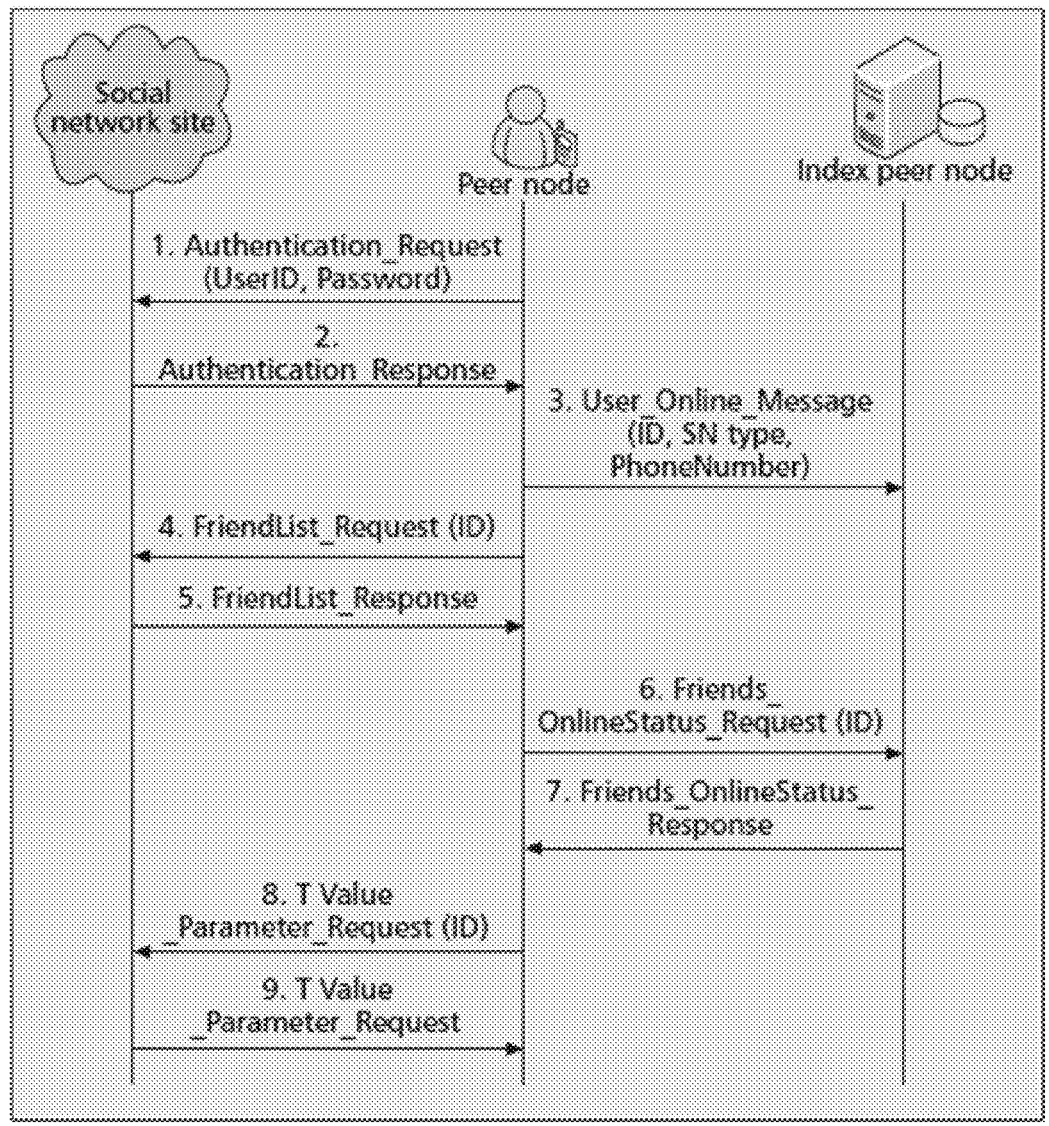
FIG. 5 shows message flow for login procedure of the present application.

When a user turns on the peer node 1 on his end device, the Login procedure is executed. FIG. 5 illustrates the message flow for the Login procedure with the following steps:

Step 1. When a user turns on the peer node 1, a SampleAuthListener 1.2 is created, and the SessionEvents.addAuthListener (new SampleAuthListener( )) function is exercised to authenticate the user in an SNS.

Step 2. If the authentication is successful, the SNS responds with the user SNS ID in the return of theSessionEvents.addAuthListener( ) function.

Step 3. The peer node 1 creates a Background Service 1.10 class to send a message (i.e., the User_Online_Message message) carrying the user's ID, Phone No., Email, IP address, port number, and SN Type, to the index peer node 2. The index peer node 2 creates an entry for the user in the global ID list.

Steps 4 and 5. The peer node 1 creates a CreateFriendListListener 1.3 (i.e., the FriendList_Request andFriendList_Response message pair) to get the IDs of the user's friends from the SNSs, and creates an entry for each friend in the Friend List.

Steps 6 and 7. The peer node 1 uses the BackgroundServiceclass to send a message (i.e., theFriends_Online-Status_Request and Friends_OnlineSta-tus_Response message pair) to the index peer node 2 to query the online friends of the user.

Steps 8 and 9. The peer node 1 creates a FeedRequestListener 1.1 class to collect the social activity information to calculate the T value from the SNS by exchanging the T Value_Parameter_Request and the T Value_Parameter_Response message pair.

Present application according to P2P-iSN provides the Global Relationship Model to identify the global relationship between two users across heterogeneous SNSs. Present application first provides a tool to measure the global relationship strength between any two users across heterogeneous SNSs. Then present application provides an i-Search mechanism to find a meaningful directional social path between two peer nodes in P2P-iSN.

Before searching for users' global relationships, we need a tool to measure the relationship strength between any two users across heterogeneous SNSs. Present application modifies the decay function defined in classical sociology on network relations to come up with more precise measurements on global relationship strength in heterogeneous SNSs.

A directional social link a→b is associated with frequency, which is denoted by f(a,b), to capture how often a user a performs some kind of social activities with user b (e.g., user a posts a comment on user b's wall, click a "Like", send a message, or makes user a call to user b). Consider there are C kinds of social activities. For $1 \leq i \leq C$, let $\lambda_i$ denote the frequency that a user a performs the ith kind of activity with user b. We define f(a,b) by $$f(a, b) = \sum_{i=1}^{C} w_i \lambda_i \quad (1)$$

where $w_i$ is the weight for the ith kind of activity, $0 \leq w_i \leq 1$ for $1 \leq i \leq C$, and $\Sigma_{i=1}^{C} w_i = 1$. Note that in Eq. (1), the weight $w_i$ is a fine tuning tool to reflect different degrees of interactions in a relationship. For example, while clicking a "Like" often carries a more casual connotation, sending an email message implies stronger intention to communicate with another user, so we can use a larger $w_i$ to the latter kind of social activity. As for $\lambda_i$, it can be obtained from the measurement in an SNS for a given time period (e.g., per month or per day). In the directional social link a→b, a larger f(a,b) value implies that user a pays more attention to user b. For example, assume there is only one kind of social activity (i.e., $w_1=1$), comment posting. If a user a posts five comments on average per day on b's wall in the SNS (i.e., $\lambda_1=5/day$), then $f(a,b)=w_1\lambda_1=5/day$. We use a threshold θ to bound f(a,b). In other words, if f(a,b)≥θ, we say that user a has enough attention on user b.

Present application descripts that an interaction factor exists between user a and user b if a←b and b→a exist, and the value F(a,b) for an interaction factor is defined by $$F(a, b) = \left(\frac{\min\{f(a, b), \theta\}}{\theta}\right)\left(\frac{\min\{f(b, a), \theta\}}{\theta}\right) \quad (2)$$

A larger F(a,b) means more interactions between user a and user b, and from Eq. (2), we have 0≥F(a,b)≥1 and F(a,b)=F(b,a).

Consider a social graph formed by heterogeneous SNSs. For example, in FIG. 6A, there are two SNSs in a social graph. Suppose that a directional social path exists from user $u_1$ (in the SNS, S1) to user $u_{L-1}$ (in the SNS, S2) through users, $u_2, u_3, \ldots, u_L$, where at least one of the L+1 users is a peer node. Denote the directional social path as a set of links, "P={$u_1 \rightarrow u_2, u_2 \rightarrow u_3, \ldots, u_{L-1} \rightarrow u_L, u_L \rightarrow u_{L-1}$}". This directional social path comprises of L directional links (i.e., the distance between $u_1$ and $u_{L+1}$ is |P|=L. To convey this directional social path, we say that a global relationship exists between $u_1$ and $u_{L+1}$. Present application a function Z(P) to measure the strength of the global relationship between u1 and uL+1, which is defined by $$Z(P) \begin{cases} 1, & \text{if } L = 0; \\ \prod_{i=1}^{L} F(u_i, u_{i+1}) & \text{otherwise(i.e., } L \geq 1) \end{cases} \quad (3)$$

From Eq. (2), we have $0 \leq F(u_i, u_{i+1}) \leq 1$ and $F(u_{i+1}, u_i)=F(u_i, u_{i+1})$ for $1 \leq i \leq L$. Then $0 \leq Z(P) \leq 1$. Furthermore, for the reverse directional path P' of P (i.e., P'={$u_{L+1} \rightarrow u_L, \ldots, u_3 \rightarrow u_2, u_2 \rightarrow u_1$}, we have Z(P')=Z(P). A larger Z(P) implies stronger global relationship. The strength Z(P) provide more precise friend recommendation and trust/reputation metrics, and also serve as a basis for content sharing across SNSs.

Present application provides an i-Search mechanism to find a directional social path between two peer nodes in P2P-iSN. The i-Search mechanism establishes social paths link by link. When a link is added into a path, global relationship strength is calculated for the new path using the Z(.) function in Eq. (3). If the global relationship strength for the new path is below a threshold value Δ, the social path search stops. Threshold value Δ is used to guarantee that the global relationship strength for the constructed path is strong enough so that users are motivated to use the global social relationship for further SNS applications.

Present application set up Δ based on the research findings in the sociology (i.e., the interaction factor for link a→b is F(a,b)=0.5). Considering a path P with length |P|=4, then using the Z(.) function in Eq. (3), the global relationship strength for the path is $Z(P)=0.5^4=0.0625$, which is considered very weak relationship. Therefore, in the performance study later, we set $\Delta=0.5^3=0.125$.

In other words, it is likely that the social path (searched by the i-Search mechanism) has path length no larger than 3. As long as the interaction factor for link a→b is $F(a,b) \leq \beta < 1$, the global relationship strength will be exponentially decreasing, and hence the flood search should have low complexity.

Details of the i-Search mechanism are given below: The index peer node maintains the online status (including the ID and IP address of the peer node) for the online peer nodes. A friend list is maintained in the peer node, which stores the online information for all friends of the peer node. To simplify the description, present application uses "the friend b of a peer node a" to imply that the social link a→b exists.

Figures 6A, 6B:
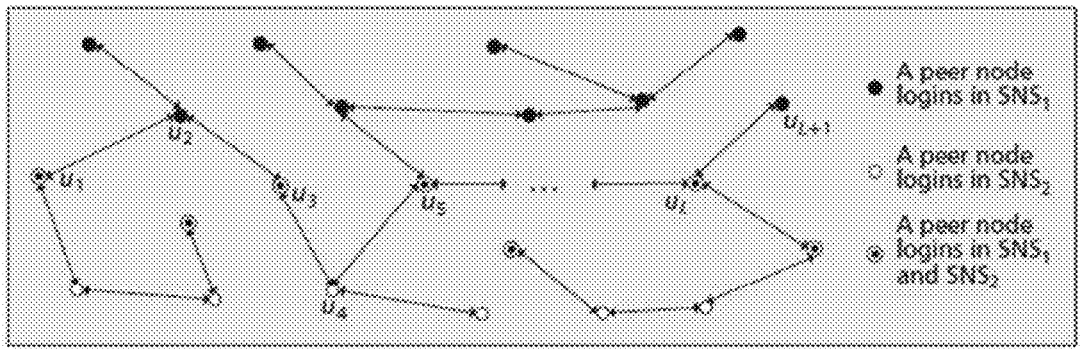
FIG. 6A shows social graph over heterogeneous SNS of the present application.
FIG. 6B shows i-Search algorithm of the present application.

When a peer node is turned on, it reports its online status to the index peer node, and receives the latest online status for his friends from the index peer node. With the latest online information, the peer node can determine whether his friend is online (i.e., a peer node is turned on). An online peer node can communicate with his online friends directly. Present application executes a recursive algorithm, i-Search, in the peer node (FIG. 6B). In this algorithm, the set G is the friend list of a peer node. The input parameter s stores the ID of the peer node who calls Algorithm 1, and r is the ID of the peer node to be searched. Initially, we set P←ϕ.

Consider the scenario where the peer node a searches for the peer node d. A user a can "request" his friend b to execute the i-Search algorithm (i.e., b.iSearch( ) in Algorithm 1) through the direct communication if b is online. That is, the directional social path P is established along the online peer nodes.

Note that the i-Search mechanism may find multiple global social relationships between two peer nodes. For the peer node who triggers the i-Search mechanism, he can use the one with the largest global social relationship strength. Furthermore, the system can speed up the execution of the i-Search mechanism by caching the searching results on the peer nodes.

All peer nodes and the corresponding social links in P2P-iSN form a social graph. A peer node may be turned on or off during the execution of i-Search, and the i-Search request can reach the friends only when the friends are online. In other words, a social link a→b does not exist if peer node a or b is turned off (i.e., off-line). Therefore, the physical network topology of P2P-iSN changes dynamically when the i-Search mechanism is being executed.

Let $P_f$ be the "path found" probability that a directional social path exists when a peer node a executes the i-Search mechanism to find a peer node d. The online status of a peer node affects the $P_f$ significantly. In this section, present application provides an analytical model to obtain an approximation value for $P_f$.

To simplify our discussion, we assume that the peer nodes in P2P-iSN are independently and identically distributed (i.i.d) in terms of network behaviors such as online status, interactions, etc. As discussed earlier, in this article, we set $\Delta=0.5^3=0.125$ in the i-Search mechanism. In present application analytical model, we use the constraint |P|≤3 instead of Δ≤0.125, i.e., the i-Search mechanism quits when the path length reaches 3 with conclusion that no global social path is found. Assume that a peer node is turned on (i.e., online) for a time period x (with the density function $f_x(.)$ and mean $1/u_x$), and then it is turned off (i.e., off-line) for a time period y (with the density function $f_y(.)$ and mean $1/u_y$). The peer node alternates between x and y. Suppose that i-Search request arrivals to a peer node form a Poisson process. The probability $p_{on}$ that an i-Search request arrives when a peer node is online can be obtained by $$p_{on} = \frac{E[x]}{E[x]+E[y]} = \frac{u_y}{u_x+u_y} \quad (4)$$

Present application provides the social graph for P2P-iSN using the Watts-Strogatz model with the three parameters a (i.e., there wire probability), n (i.e., the total number of peer nodes in P2P-iSN), and m (i.e., the average number of friends of a peer node). With the setup:

$$0<\alpha<1 \text{ and } n \gg m \gg \ln n \gg 1 \quad (5)$$

The Watts-Strogatz model has the small-world property, including small average path length and high clustering, which can also be applied to study SNS.

Let $N_t$ denote the expected number of the peer nodes that receive the i-Search request message during the execution of the i-Search mechanism. Consider the scenario that the peer node a executes the i-Search mechanism to search for a directional social path to d. If d belongs to one of the $N_t$ peer nodes, then the directional social path from a to d is found. Therefore, we have $$P_f = \frac{N_t}{n}$$

Present application derives $N_t$ as follows. There are two types of nodes including "far-nodes" and "near-nodes" defined in the Watts-Strogatz model. The far-nodes represents the peer nodes that have social links after rewiring with probability a. The near-nodes represents the peer nodes that have social links initially.

In the social graph of the P2P-iSN, let Nf and Nn, respectively, be the expected numbers of far-nodes and near nodes that receive an i-Search request when the i-Search mechanism is executed. Then we have $$N_t = N_f + N_n$$

$N_f$ and $N_n$ are obtained as follows. One round means that the i-Search request is delivered using a directional social link a→b when both peer nodes a and b are online. In the i-Search mechanism, there are at most three rounds to construct a directional social path. In each round, a peer node that triggers the round can be either a far-node or near-node:

Case 1 The peer node that triggers the round is a far-node. In this case, there are on average $m\alpha p_{on}$ far-nodes and $m(1-\alpha)p_{on}$ near-nodes that can receive the i-Search request.

Case 2 The peer node that triggers the round is a near-node. Because there is high probability that the near-node sends the i-Search request to another near-node that has received this i-Search request previously, we consider that only far-nodes can receive the i-Search request for the approximation. In this case, there are on average $m\alpha p_{on}$ far-nodes that can receive the i-Search request.

Then, using the following iterative procedure to calculate the $N_f$ and $N_n$.

Procedure 1.
Input parameters: $\alpha$, m, $u_x$, $u_y$.
Output measures: $N_f$, $N_n$, $N_t$
Step 1. Select initial values, $N_f \leftarrow 1$, $N_n \leftarrow 0$, and round $\leftarrow 0$;
Step 2.

$$N_f \leftarrow m\alpha\left(\frac{u_y}{u_x + u_y}\right)(N_f + N_n);$$

$$N_n \leftarrow m(1-\alpha)\left(\frac{u_y}{u_x + u_y}\right)(N_f); \text{round}++$$

Step 3. If (round≤3), then go to Step 2. Otherwise, go to the next step.
Step 4. $N_t \leftarrow N_f + N_n$; return.

The analytical model is validated by simulation experiments of a discrete event-driven simulation model, which has been widely adopted to simulate the mobile communications network in several studies. The simulation model simulates the online/off-line behavior of a peer node and the behavior of the i-Search mechanism.

In the simulation model, we adopt the aforementioned discrete event-driven approach and define five types of events listed below:

The QUERY_ARRIVAL event represents that an online peer node starts the i-Search mechanism to find another peer node.

The QUERY_FORWARD event represents that an online peer node sends a i-Search request to his online friend.

The QUERY_RESPONSE event represents that an online peer node returns the results (i.e., a path is found) for the execution of the i-Search algorithm to the peer node who sends the i-Search request.

The ONLINE event represents that a peer node is turned on.

The OFFLINE event represents that a peer node is turned off.

Present application maintains a timestamp $t_s$ to indicate the time when an event occurs. The events are inserted into an event list and deleted/processed from the list in a non-decreasing timestamp order. During execution of the simulation, a simulation clock $t_C$ is maintained, which indicates the progress of simulation. The following variables are used in the simulation model:

$N_r$ indicates the number of rounds that have been executed for an i-Search request.

a is the ID of the peer node who triggers the i-Search mechanism.

d is the ID of the peer node to be found.

l indicates whether a social link exists between two peer nodes.

We use the following counters in our simulation model to calculate the output measure:

The $C_f$ counter counts the total number of finding a path successfully.

The $C_q$ counter counts the total number of the QUERY_ARRIVAL events that have been processed.

Present application repeats the simulation runs until $C_q$ exceeds 100,000 to ensure the stability of the simulation results. Then we obtain the output measure:

$$P_f = \frac{C_f}{C_q}$$

Figure 7:
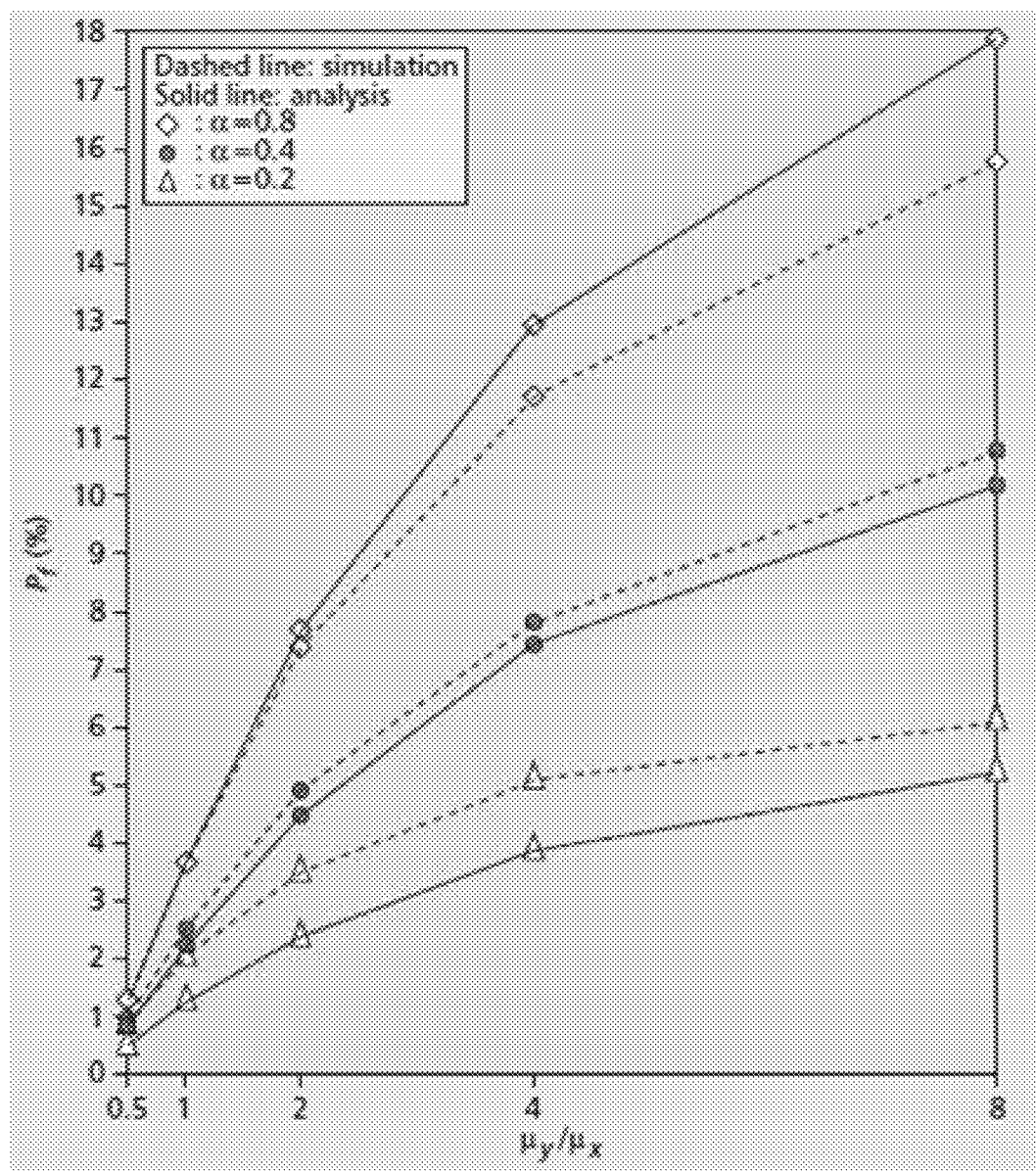
FIGS. 7 and 8 shows the comparison between the analytical and simulation result.
Figure 8:
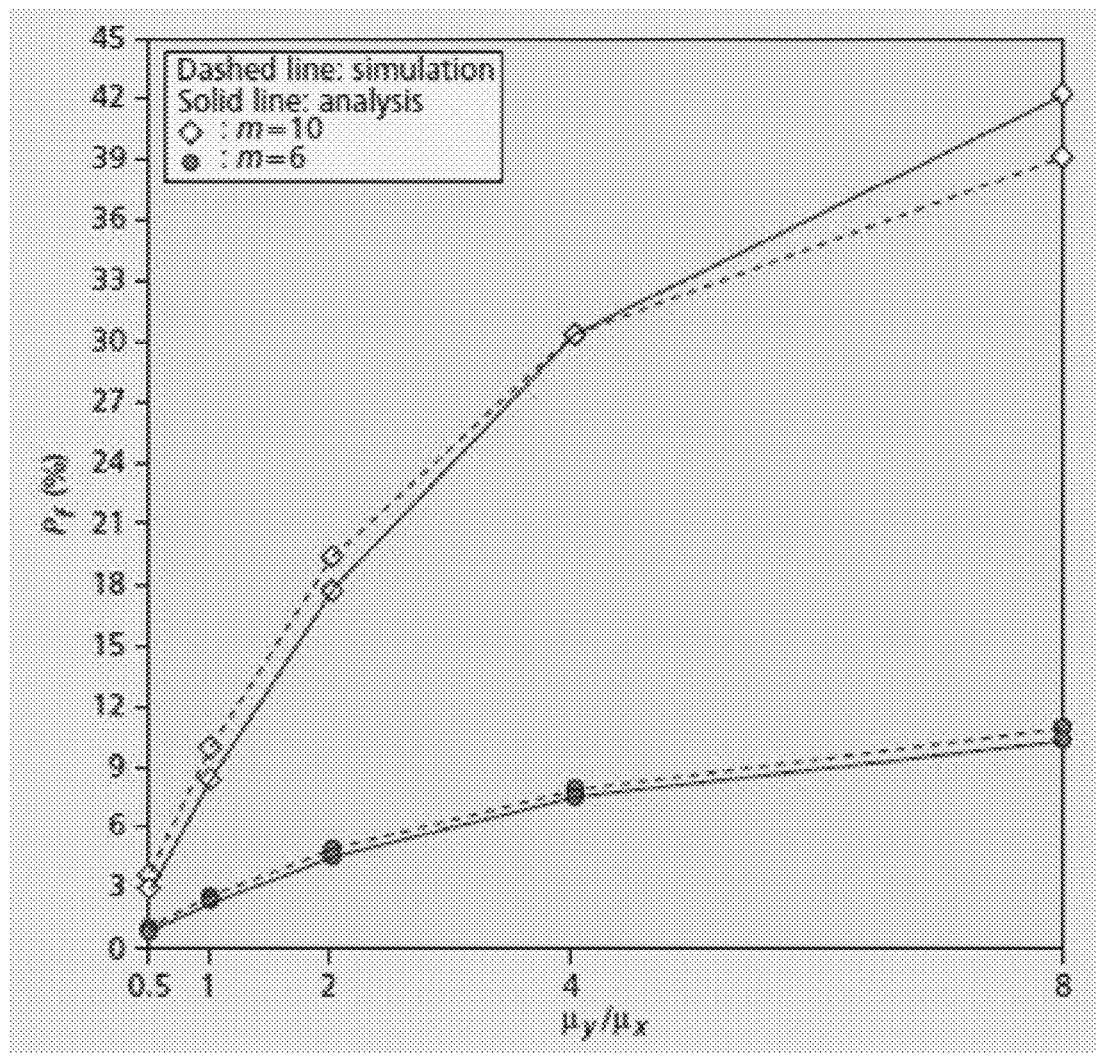

FIG. 7 and FIG. 8 show the comparison between the analytical and simulation results, whose details of the parameter setups are described below. The figures indicate that the simulation results approximate the analytical results well.

In the following, we study the effects of the input parameters on the $P_f$ performance for the i-Search mechanism. In our study, we set the input parameters following the constraints in Eq. (5), and we set the total number of Peer nodes n=1000. The effects of the input parameters are described as follows.

In FIG. 7 and FIG. 8, we change $u_y/u_x$ from 0.5 to 8. A larger $u_y/u_x$ implies that the peer node spends more time online. For example, when $u_y/u_x$=0.5 and $u_y/u_x$=8, from Eq. (4), we have $p_{on}$=1/3 and $p_{on}$=8/9, respectively. Both figures show that the path found probability $p_f$ increases as $u_y/u_x$ increases. It is worth noticing that we have $p_f$ larger than 15 percent when $u_y/u_x$=8 and $\alpha$=0.8 as shown in FIG. 7 (with m=6), and $p_f$ is around 40 percent when $u_y/u_x$=8 and m=10 as shown in FIG. 8.

Observing FIG. 7 where we set m=6, we study the effects of $\alpha$. A larger $\alpha$ implies that the social graph of P2P-iSN is sparser (i.e., more far-nodes). FIG. 7 indicates that $p_f$ increases as $\alpha$ increases, which means that in a sparser social graph, the i-Search mechanism attains better found probability. In FIG. 8, we study the effects of m where we set $\alpha$=0.4. A larger m implies more friends of a peer node. FIG. 8 shows that with more friends, the i-Search mechanism achieves better $p_f$ performance.

In summary, when in a sparser social graph and a peer node has more friends, there is 40 percent probability that the i-Search mechanism could find a global social relationship for the user, i.e. a social path with strong relationship strength.

What is claimed is:

1. A peer-to-peer networking method for integrating heterogeneous social networks, applied in a server device, comprising:
   connecting with a plurality peer nodes, each of the peer node defining a user end and accessing at least one social network; and
   the server device analyzing a directional social relationship between any two of the peer nodes according to a social relationship of the social networks, a social activity and a weight of the social activity in a time period, so as to provide a social frequency having directivity and weight, the server device further relating the corresponding peer nodes which has interactive-direction relationship and the social frequency meets a threshold value for integrating a peer-to-peer social network (P2P-iSN) which decides an effective social relationships among the peer nodes from the different social networks;
   wherein the server device analyzes a social strength of the social relationship between the user peer nodes so as to determines the effective social relationship, or analyzes the social strength of elated peer nodes in a set of the social relationships between the two user peer nodes with indirect relationship to determine the effective social relationship; then the server device provides interaction between the two user peer nodes;
   wherein the social frequency is expressed as following equation:

$$f(a, b) = \sum_{i=1}^{C} w_i \lambda_i$$

wherein, f(a,b) denotes the social frequency of directional social relationship user a→user b, $w_i$ denotes the weight for the ith kind of activity, C denotes kinds of social activities, $\lambda_i$ denotes frequency that the user a performs the ith kind of activity with the user b.

2. The method as claimed in claim 1, wherein a interaction activity of the interactive-direction relationship is expressed as following equation:

$$F(a, b) = \left(\frac{\min\{f(a, b), \theta\}}{\theta}\right)\left(\frac{\min\{f(b, a), \theta\}}{\theta}\right)$$

wherein, F(a,b) denotes the interaction activity between the user a and the user b, f(b,a) denotes the social frequency of directional social relationship user b→user a, θ denotes a threshold value.

3. The method as claimed in claim 2, wherein the social strength is expressed as following equation:

$$Z(P) \begin{cases} 1, & \text{if } L = 0 \\ \prod_{i=1}^{L} F(u_i, u_{i+1}) & \text{otherwise(i.e., } L \geq 1) \end{cases}$$

wherein, u denotes the social relationships, L denotes a direction relationship value of the social relationships, P denotes the set of the social relationships.

4. The method as claimed in claim 1, further analyzing the social strength of the new added social relationships, and determining to identify the new added social relationships.

5. The method as claimed in claim 1, further comprising:
accessing an online status of the online peer node; and
providing a corresponding friendship online status to the online peer node, and making the online peer node to communicate with other peer nodes according to the friendship online status.

6. A peer-to-peer networking system for integrating heterogeneous social networks, comprising:
a communication module, connected with a plurality peer nodes, each of the peer node defining a user end and accessing at least one social network; and
a processing module, connected with the communication module, the processing module analyzing a directional social relationship between any two of the peer nodes according to a social relationship of the social networks, a social activity and a weight of the social activity in a time period, so as to provide a social frequency having directivity and weight, the server device further relating to the corresponding peer nodes which have interactive-direction relationship and the social frequency meets a threshold value for integrating a peer-to-peer social network (P2P-iSN) which decides an effective social relationships among the peer nodes from the different social networks;
wherein the processing module analyzes a social strength of the social relationship between the user peer nodes so as to determines the effective social relationship, or analyzes the social strength of related peer nodes in a set of the social relationships between the two user peer nodes with indirect relationship to determine the effective social relationship; then the processing module provides interaction between the two user peer nodes;
Wherein the social frequency is expressed as following equation:

$$f(a, b) = \sum_{i=1}^{C} w_i \lambda_i$$

wherein, f(a,b) denotes the social frequency of directional social relationship user a→user b, $w_i$ denotes the weight for the ith kind of activity, C denotes kinds of social activities, $\lambda_i$ denotes frequency that the user a performs the ith kind of activity with the user b.

7. The system as claimed in claim 6, wherein the indirect interaction further comprises friend recommendation.

8. The system as claimed in claim 6, wherein the processing module further accesses an online status of the online peer node, provides a corresponding friendship online status to the online peer node, and makes the online peer node to communicate with other peer nodes according to the friendship online status.

* * * * *